United States Patent
Wilenski et al.

(10) Patent No.: US 10,160,840 B2
(45) Date of Patent: Dec. 25, 2018

(54) POLYMER NANOPARTICLES FOR CONTROLLING PERMEABILITY AND FIBER VOLUME FRACTION IN COMPOSITES

(71) Applicant: The Boeing Company, Chicago, IL (US)

(72) Inventors: Mark S. Wilenski, Mercer Island, WA (US); Samuel J. Meure, Fishermans Bend (AU); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 444 days.

(21) Appl. No.: 14/493,368

(22) Filed: Sep. 23, 2014

(65) Prior Publication Data

US 2016/0083536 A1    Mar. 24, 2016

(51) Int. Cl.
*C08J 5/06* (2006.01)
*B05D 1/12* (2006.01)
*B82Y 30/00* (2011.01)

(52) U.S. Cl.
CPC ............ *C08J 5/06* (2013.01); *B05D 1/12* (2013.01); *B82Y 30/00* (2013.01); *C08J 2300/00* (2013.01)

(58) Field of Classification Search
CPC .......... C08J 5/06; C08J 2300/00; B82Y 30/00
USPC ...................................... 428/300.1
See application file for complete search history.

(56) References Cited

U.S. PATENT DOCUMENTS

| | | | |
|---|---|---|---|
| 3,860,565 A | 1/1975 | Barber, Jr. | |
| 3,943,090 A | 3/1976 | Enever | |
| 4,306,040 A | 12/1981 | Baer | |
| 4,861,803 A | 8/1989 | Turner | |
| 4,954,195 A * | 9/1990 | Turpin | B29C 70/025 156/242 |
| 5,028,478 A | 7/1991 | Odagiri et al. | |
| 5,364,657 A | 11/1994 | Throne | |
| 5,589,523 A | 12/1996 | Sawaoka et al. | |
| 5,605,745 A | 2/1997 | Recker et al. | |
| 5,618,857 A | 4/1997 | Newberth | |

(Continued)

FOREIGN PATENT DOCUMENTS

| | | |
|---|---|---|
| CA | 2312467 A1 | 9/1996 |
| CN | 101623266 A | 1/2010 |

(Continued)

OTHER PUBLICATIONS

Extended European Search Report, European Application No. 15186470.9-1554, dated Feb. 12, 2016.

(Continued)

*Primary Examiner* — Vincent Tatesure

(57) ABSTRACT

A fiber tow may include a plurality of reinforcing filaments each having a filament cross-sectional width. At least a portion of the polymer nanoparticles may be coupled to at least one of the reinforcing filaments and/or to other polymer nanoparticles. The polymer nanoparticles may have a particle cross-sectional width that is less than the reinforcing filament cross-sectional width. The polymer nanoparticles may provide a local filament spacing between the reinforcing filaments to reduce or avoid direct contact between reinforcing filaments, to allow for resin flow between the filaments, and/or to meet fiber volume fraction requirements.

21 Claims, 10 Drawing Sheets

(56) References Cited

U.S. PATENT DOCUMENTS

| | | |
|---|---|---|
| 5,891,249 A | 4/1999 | Bieler et al. |
| 6,503,856 B1 | 1/2003 | Broadway et al. |
| 6,508,897 B1 | 1/2003 | Yamaguchi |
| 6,518,330 B2 | 2/2003 | White et al. |
| 6,740,185 B2 | 5/2004 | Baldwin |
| 6,900,254 B2 | 5/2005 | Wills |
| 7,037,865 B1 | 5/2006 | Kimberly |
| 7,122,250 B2 | 10/2006 | Kinsho et al. |
| 7,435,693 B2 | 10/2008 | Tsotsis et al. |
| 7,645,402 B2 | 1/2010 | Choi et al. |
| 7,655,295 B2 | 2/2010 | Smith et al. |
| 7,678,847 B2 | 3/2010 | Yan et al. |
| 7,738,763 B2 | 6/2010 | Ouderkirk |
| 7,910,636 B2 | 3/2011 | Barker |
| 8,080,313 B2 | 12/2011 | Bonneau et al. |
| 8,088,470 B2 | 1/2012 | Dolby |
| 8,101,106 B2 | 1/2012 | Ellis |
| 8,283,404 B2 | 10/2012 | Allen |
| 8,288,453 B2 | 10/2012 | Hsu et al. |
| 8,519,505 B2 | 8/2013 | Hiroshige et al. |
| 8,703,630 B2 | 4/2014 | LoFaro et al. |
| 2002/0119331 A1 | 8/2002 | Jiang |
| 2003/0174994 A1 | 9/2003 | Garito et al. |
| 2005/0070666 A1 | 3/2005 | Martin |
| 2005/0255236 A1 | 11/2005 | Deng |
| 2006/0057355 A1 | 3/2006 | Suzuki et al. |
| 2006/0269738 A1 | 11/2006 | Kimberly |
| 2007/0248827 A1 | 10/2007 | Rukavina |
| 2008/0176987 A1 | 7/2008 | Trevet et al. |
| 2009/0004460 A1 | 1/2009 | Gruber et al. |
| 2009/0130376 A1 | 5/2009 | Berkel et al. |
| 2009/0326137 A1 | 12/2009 | Hsu et al. |
| 2010/0249277 A1 | 9/2010 | Fang |
| 2010/0273382 A1* | 10/2010 | Nandi ............... C09D 5/18 442/76 |
| 2010/0280151 A1 | 11/2010 | Nguyen |
| 2010/0304119 A1 | 12/2010 | Bonneau |
| 2011/0021360 A1 | 1/2011 | Al-Ghamdi |
| 2011/0028308 A1 | 2/2011 | Shah et al. |
| 2012/0064283 A1 | 3/2012 | Hill et al. |
| 2013/0029574 A1 | 1/2013 | Van Der Steen |
| 2013/0167502 A1 | 7/2013 | Wilson |
| 2013/0221285 A1 | 8/2013 | Song et al. |
| 2014/0023862 A1 | 1/2014 | Johnson |
| 2014/0038481 A1* | 2/2014 | Chen .................. E04D 1/20 442/59 |
| 2014/0076198 A1 | 3/2014 | Kim et al. |
| 2014/0295723 A1 | 10/2014 | Nelson |
| 2015/0025218 A1 | 1/2015 | Gokturk et al. |
| 2015/0259493 A1 | 9/2015 | Nederkoom |
| 2016/0300810 A1 | 10/2016 | Kanamori |

FOREIGN PATENT DOCUMENTS

| | | |
|---|---|---|
| EP | 0378854 | 7/1990 |
| EP | 1066224 | 12/2001 |
| EP | 2236549 | 10/2010 |
| EP | 2236549 A1 | 10/2010 |
| EP | 2886590 A1 | 6/2015 |
| WO | WO1999021697 | 5/1999 |
| WO | WO2014073960 | 5/2014 |
| WO | WO2014074767 A1 | 5/2014 |
| WO | 2015097283 | 7/2015 |
| WO | WO2015097283 | 7/2015 |

OTHER PUBLICATIONS

European Search Report for EP15186490, dated Jan. 22, 2016.
Sober, D.J., "Kaneka Core-Shell Toughening Systems for Thermosetting Resins," 2007.
Suzuki, M.; Nagai, A.; Suzuki, M., Takahashi, A.: "Relationship between Structure and Mechanical Property for Bismaleimide-Biscyanamide resin," 1992. J. App. Poly. Sci, 45, pp. 177-180.
Fan, H.; Lei, Z.; Pan, J.H.; Zhao, X.S., "Sol-gel synthesis, microstructure and adsorption properties of hollow silica spheres," Materials Letters 65 (2011), 1811-1814.
Hydro, et al., Journal of Polymer Science: Part B: Polymer Physics, 45,1470-1481 (2007).
Hackett et al., "The Effect of Nanosilica Concentration on the Enhancement of Epoxy Matrix Resins for Prepreg Composites," Society for the Advancement of Material and Process Engineering, 2010.
Nagavarma et al., "Different Techniques for Preparation of Polymeric Nanoparticles—A Review," Asian Journal of Pharmaceutical and Clinical Research, vol. 5, Suppl 3, 2012.
Diaz, Jairo et al. Thermal Expansion of Self-Organized and Shear-Oriented Cellulose Nanocrystal Films, Biomacromolecules, 2013 14(8), pp. 2900-2908. published online Jul. 10, 2013.
Examination Report, European Application No. 15186470.9, dated Nov. 11, 2017.
Fu et al., "Effects of particle size, particle/matrix interface adhesion and particle loading on mechanical properties of particulate-polymer composites," Composites Part B: Engineering, vol. 39, Issue 6, pp. 907-1068, Sep. 2008.
Salviato et al., "Nanoparticle debonding strength: A comprehensive study on interfacial effects," International Journal of Solids and Structures, vol. 50, Issues 20-21, pp. 3225-3232, Oct. 1, 2013.
Chinese Office Action Chinese Application No. 2015105183855, dated Jul. 24, 2018.

* cited by examiner

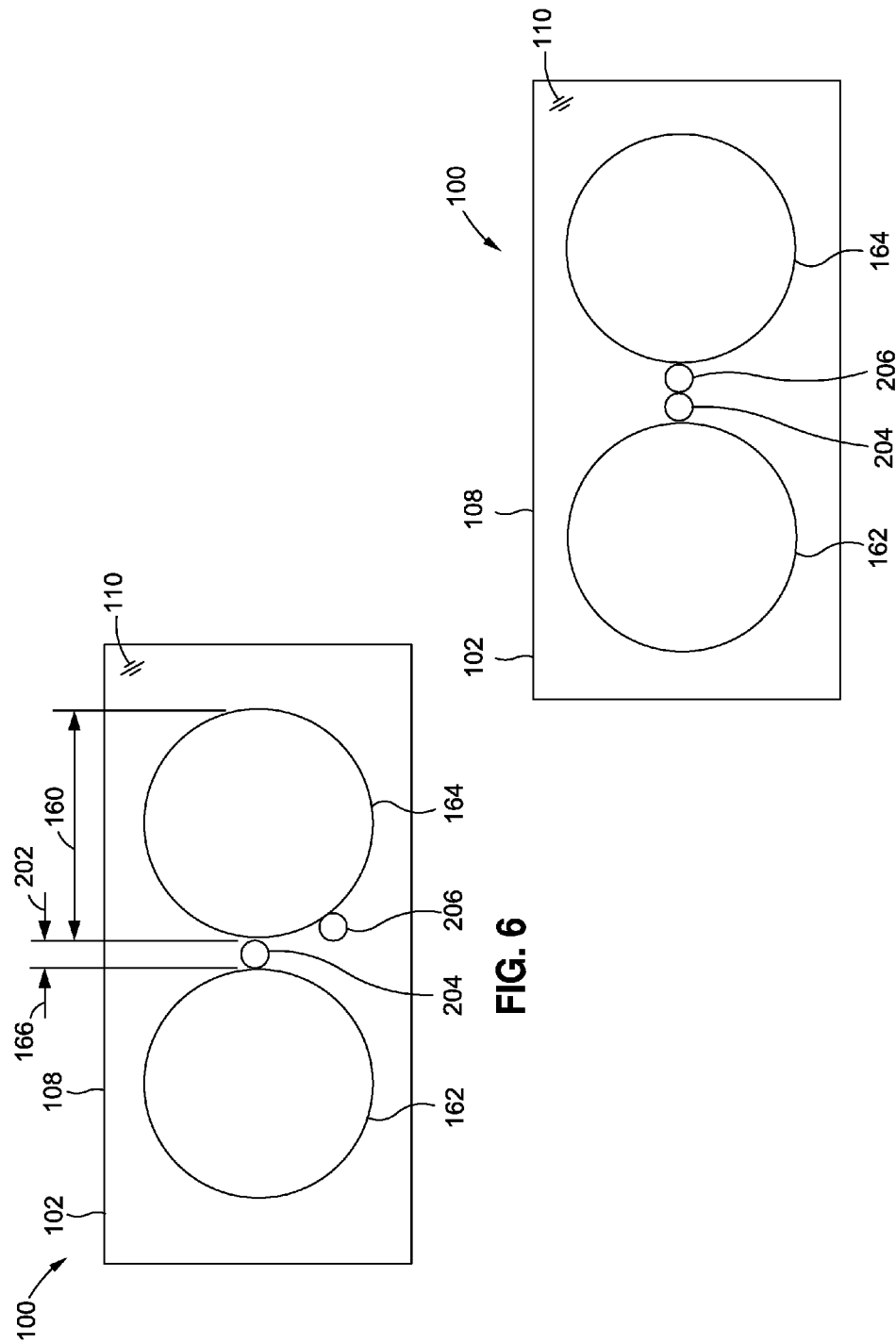

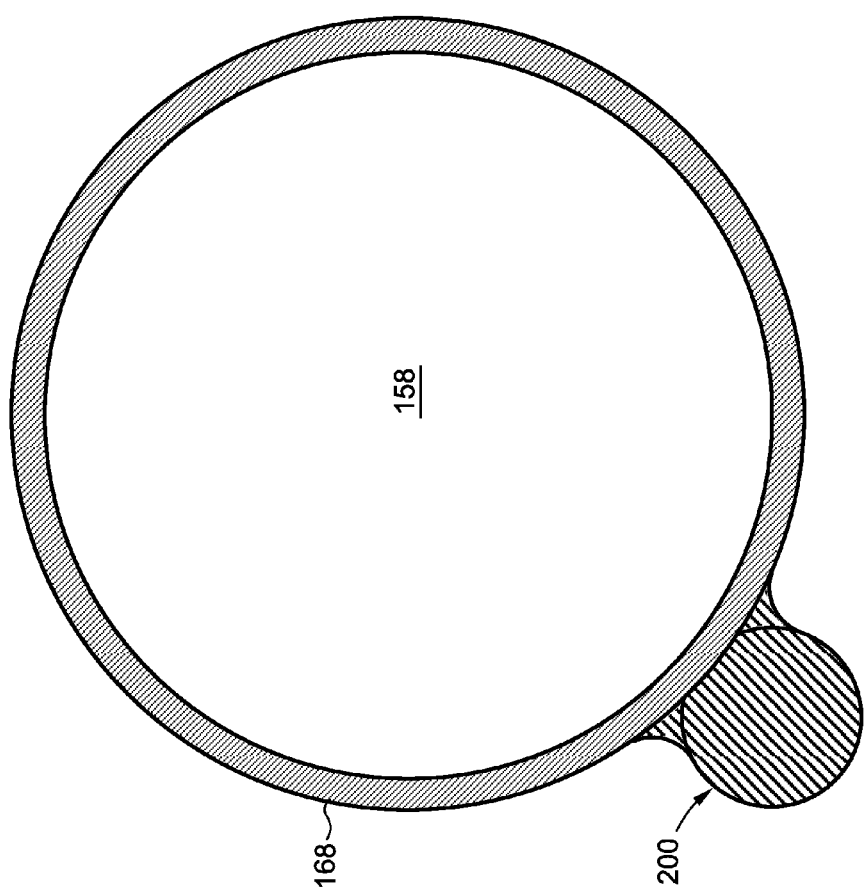

POLYMER NANOPARTICLES FOR CONTROLLING PERMEABILITY AND FIBER VOLUME FRACTION IN COMPOSITES

FIELD

The present disclosure relates generally to composite materials and, more particularly, to the use of nanoparticles in composite structures for controlling fiber bed permeability and fiber volume fraction.

BACKGROUND

A composite structure may be formed by laying up a stack of composite plies to form a composite layup. Each composite ply may include a plurality of reinforcing fibers or fiber tows. Each fiber tow may include a plurality of reinforcing filaments. For example, a single fiber tow may be formed as a bundle of several thousand or more reinforcing filaments. Heat and/or pressure may be applied to the composite layup to consolidate the stack of composite plies and cure or solidify the resin. The composite layup may be passively or actively cooled to form a composite structure.

Composite structures are typically designed to have a specific fiber volume fraction to meet strength, stiffness, and other design requirements of the composite structure. Fiber volume fraction may be described as the ratio of the total volume of reinforcing fibers in a composite structure to the total volume of the composite structure. The accuracy with which the fiber volume fraction of a composite layup can be controlled during manufacturing may have a significant effect on the ability of the composite structure to meet the design requirements.

The spacing between reinforcing filaments in a composite layup may have a direct effect on the fiber volume fraction of a composite structure. For composite plies that are pre-impregnated with resin (e.g., prepreg composite plies) prior to layup, the spacing between the reinforcing filaments may be directly controlled by controlling the amount of resin applied to the fiber tows or reinforcing filaments during prepregging operations. For composite layups formed with dry fiber composite plies, the spacing between the reinforcing filaments may be indirectly controlled by controlling the layup processing conditions such as controlling the magnitude and/or duration of consolidation pressure and/or vacuum pressure applied during infusion of resin into the dry fiber composite plies.

In conventional composites manufacturing, the local spacing between reinforcing filaments may vary from many filament diameters to zero. At zero spacing, the reinforcing filaments are in direct contact with one another. Direct contact between reinforcing filaments may result in several undesirable effects. For example, directly-contacting reinforcing filaments may inhibit resin flow between reinforcing filaments during a resin infusion process which may result in incomplete wetting of the reinforcing filaments creating undesirable voids and sites for crack nucleation. In addition, directly-contacting reinforcing filaments may represent locations of high stress in a composite structure, and may result in micro-cracking in the resin.

As can be seen, there exists a need in the art for a system and method for controlling the local spacing between reinforcing filaments in a composite layup to allow for resin flow between filaments, to meet fiber volume fraction requirements, and to reduce or avoid direct contact between reinforcing filaments.

SUMMARY

The above-noted needs associated with composite layups are specifically addressed by the present disclosure which provides a fiber tow that may include a plurality of reinforcing filaments each having a filament cross-sectional width. One or more polymer nanoparticles may be coupled to at least one of the reinforcing filaments and/or to other polymer nanoparticles. The polymer nanoparticles may have a particle cross-sectional width that is less than the reinforcing filament cross-sectional width. The polymer nanoparticles may provide a local filament spacing between the reinforcing filaments to reduce or avoid direct contact between reinforcing filaments, to allow for resin flow between the filaments, and/or to meet fiber volume fraction requirements.

Also disclosed is composition including a resin and a plurality of fiber tows embedded in the resin. Each one of the fiber tows may be comprised of a plurality of reinforcing filaments. Each reinforcing filament may have a filament cross-sectional width. The composition may further include a plurality of polymer nanoparticles coupled to the reinforcing filaments. The polymer nanoparticles may have a particle cross-sectional width that is less than the filament cross-sectional width.

Also disclosed is a method of manufacturing a composite structure. The method may include coupling a plurality of polymer nanoparticles to one or more reinforcing filaments. Each one of the reinforcing filaments may have a filament cross-sectional width. The polymer nanoparticles may have a particle cross-sectional width that is less than the filament cross-sectional width. The method may additionally include maintaining, using the polymer nanoparticles, a filament spacing between adjacent reinforcing filaments such as during resin infusion.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 6 is a schematic view of a first filament and second filament embedded in resin and showing the first filament separated from the second filament by a polymer nanoparticle which may be coupled to the first filament and/or to the second filament such that the polymer nanoparticle prevents contact between the first and second filament;

FIG. 7 is a schematic view of a first polymer nanoparticle coupled to a first filament and a second polymer nanoparticle coupled to a second filament and to the first polymer nanoparticle and preventing contact between the first and second filament;

FIG. 10 is a schematic illustration of a polymer nanoparticle coupled to a sizing of a reinforcing filament;

DETAILED DESCRIPTION

Figure 1:
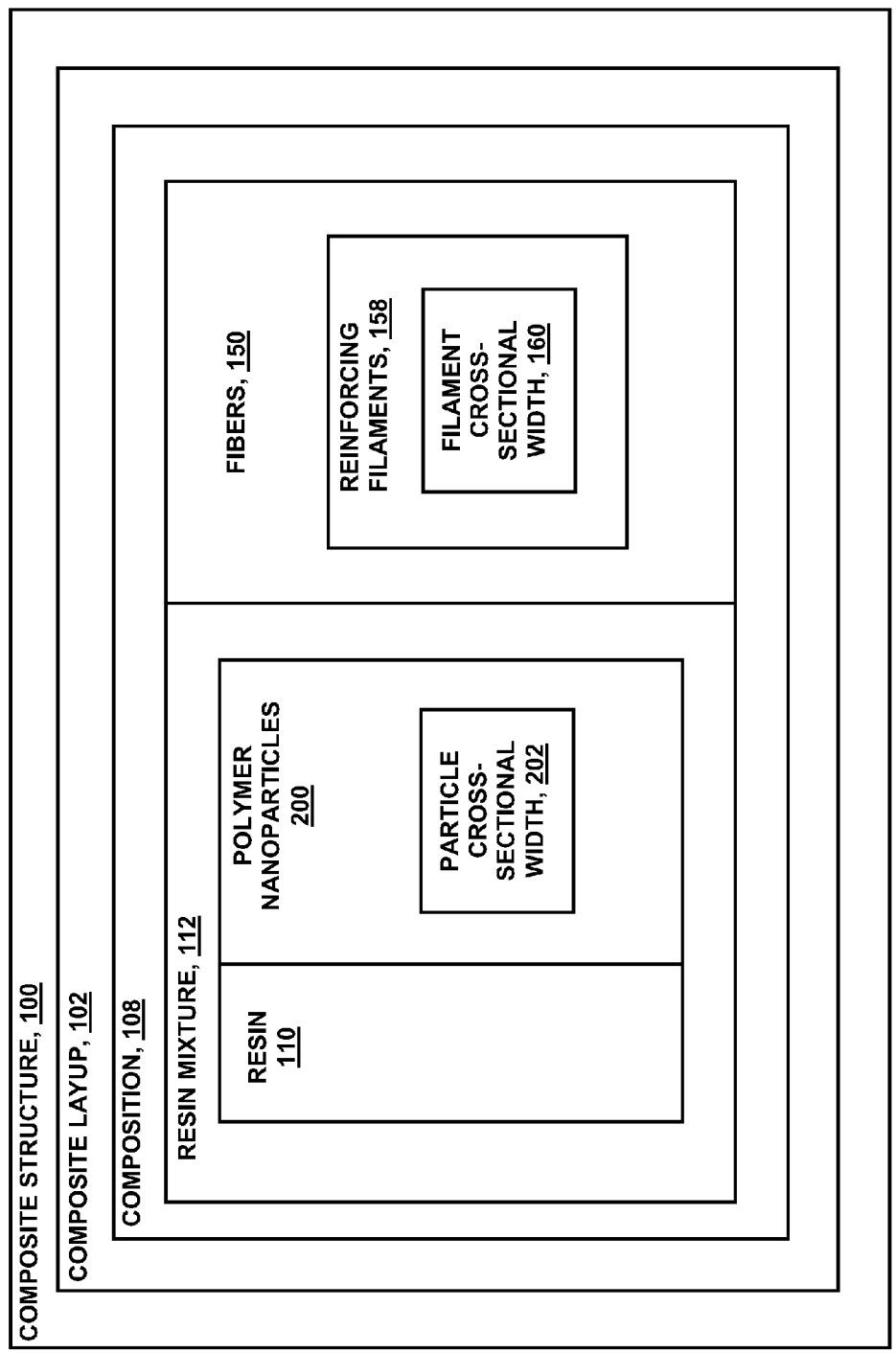
FIG. 1 is a block diagram of a composite structure including resin and fiber tows formed of reinforcing filaments and including polymer nanoparticles for maintaining a filament spacing between adjacent reinforcing filaments.

Referring now to the drawings wherein the showings are for purposes of illustrating various embodiments of the disclosure, shown in FIG. 1 is a block diagram of a composite structure 100 including a fiber bed comprising fiber tows 150. The fiber tows 150 may be embedded in resin 110. Each one of the fiber tows 150 may include a plurality of reinforcing filaments 158. Each one of the reinforcing filaments 158 may have a filament cross-sectional width 160 (FIG. 6) or diameter. One or more polymer nanoparticles 200 may be coupled to the reinforcing filaments 158 and/or to other polymer nanoparticles 200.

In some examples, a portion of the polymer nanoparticles 200 may include non-coupled nanoparticles 214 (e.g., see FIG. 5) which may be mechanically entrapped adjacent to one or more reinforcing filaments 158 and/or adjacent to one or more polymer nanoparticles 200. Each one of the polymer nanoparticles 200 may have a particle cross-sectional width 202 (FIG. 6) that may be less than the filament cross-sectional width 160. For example, the polymer nanoparticles 200 have a particle cross-sectional width 202 of 10-200 nanometers, and the reinforcing filaments 158 may have a filament cross-sectional width 160 of 5-30 microns. For example, carbon reinforcing filaments 158 may have a filament cross-sectional width of 5-10 microns. Glass reinforcing filaments 158 may have a filament cross-sectional width of 10-25 microns.

Advantageously, the polymer nanoparticles 200 may act as spacers between the reinforcing filaments 158, and may maintain or control the permeability of the fiber bed 152 such that resin 110 may flow between the reinforcing filaments 158 (FIG. 1) and/or infuse or uniformly wet out the reinforcing filaments 158. In addition, the polymer nanoparticles 200 may prevent direct contact between reinforcing filaments 158. As indicated above, direct filament-to-filament contact between reinforcing filaments 158 may represent regions of locally high fiber content in a composite structure 100 (FIG. 1). The polymer nanoparticles 200 may prevent direct filament-to-filament contact and associated regions of locally high fiber content in a composite layup 102, and may thereby reduce or avoid stress concentrations at such locations which may represent crack initiation sites.

Furthermore, the polymer nanoparticles 200 may provide a means for accurately controlling the fiber volume fraction of the final composite structure 100. As indicated above, the fiber volume fraction of a composite structure 100 may be described as the ratio of the volume of reinforcing fibers 150 (FIG. 1) in the composite structure 100 to the total volume of the composite structure 100. The polymer nanoparticles 200 may be configured as spacers between the reinforcing filaments 158 at least during the portion of the manufacturing process when resin flows through or between the reinforcing filaments 158. The particle cross-sectional width 202 of the polymer nanoparticles 200 and/or the total volume of polymer nanoparticles 200 relative to the resin volume may provide a means for accurately controlling the fiber volume fraction of the composite layup 102 which may have a significant effect on the ability of the composite structure 100 to meet design requirements such as strength and stiffness requirement.

Figure 2:
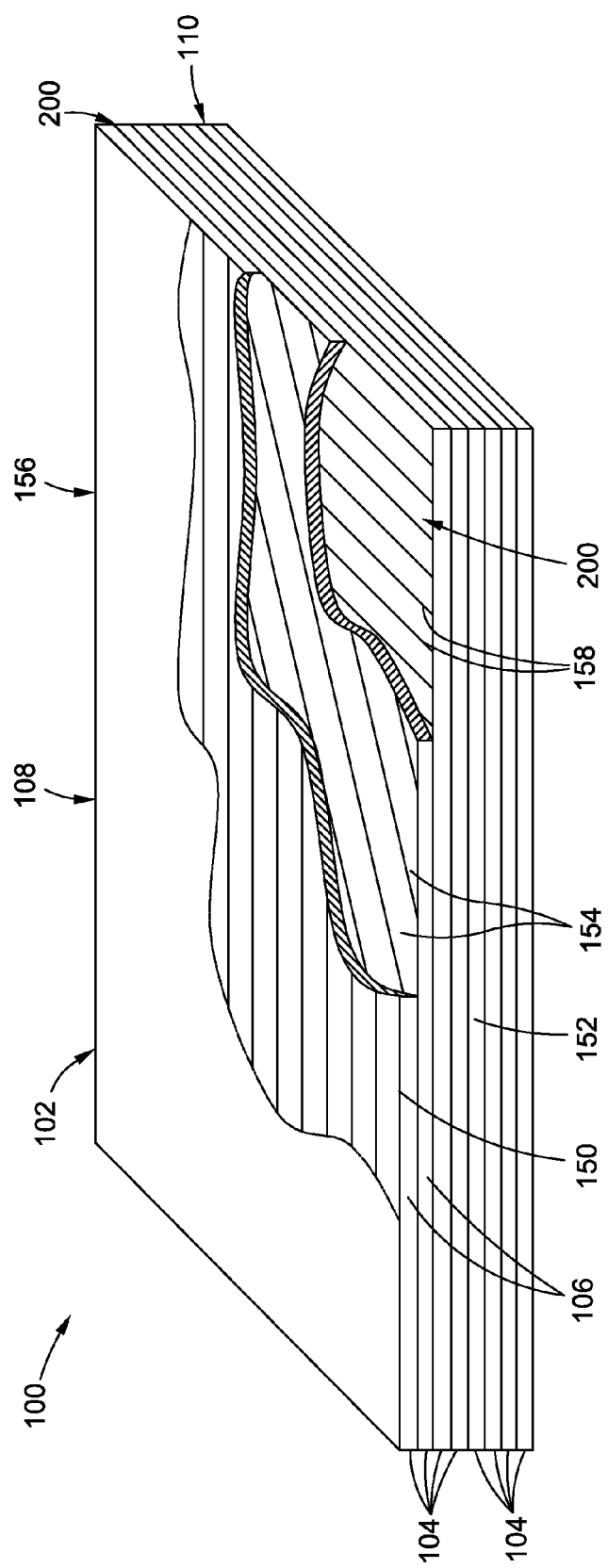
FIG. 2 is a perspective view of a composite structure including a stack of unidirectional plies each formed of a plurality of continuous reinforcing fibers.

FIG. 2 shows a composite structure 100 made of a stack of composite plies 104. In the example shown, the composite structure 100 may be formed of unidirectional plies 106. Each one of the composite plies 104 may include a plurality of generally parallel, continuous reinforcing fibers or fiber tows 150. A unidirectional ply 106 may include a plurality of unidirectional tapes 154 each containing fiber tows 150 arranged side-by-side. Alternatively, one or more of a composite plies 104 may be formed of unidirectional sheet containing parallel fiber tows 150. As indicated above, each one of fiber tows 150 may be made up of a bundle of several thousand reinforcing filaments 158. For example, a single fiber tow 150 may include up to 100,000 or more reinforcing filaments 158. Each reinforcing filament 158 may have a diameter of up to 30 microns. For example, as indicated above, carbon reinforcing filaments 158 may have a filament cross-sectional width of 5-10 microns (e.g., 5-7 microns). Glass reinforcing filaments 158 may have a filament cross-sectional width of 10-25 microns. In the present disclosure, the terms fiber, reinforcing fiber, composite fiber, and fiber tow may be used interchangeably.

A composite layup 102 may be provided using fiber tows 150 arranged in any one of a variety of different fiber forms including, but not limited to, unidirectional tape, woven fabric, braided fibers, stitched fiber forms, chopped fiber forms (e.g., chopped fiber mat), and any other type of crimp and non-crimp fiber forms. Regardless of the form or arrangement of the fiber tows 150 (FIG. 2), polymer nanoparticles 200 may be coupled to one or more the reinforcing filaments 158 of one or more of the fiber tows 150 to maintain or control the filament spacing 166 (FIG. 6) between the reinforcing filaments 158, and thereby control the permeability of the composite layup 102 and/or the fiber volume fraction of the final composite structure 100.

Figure 3:
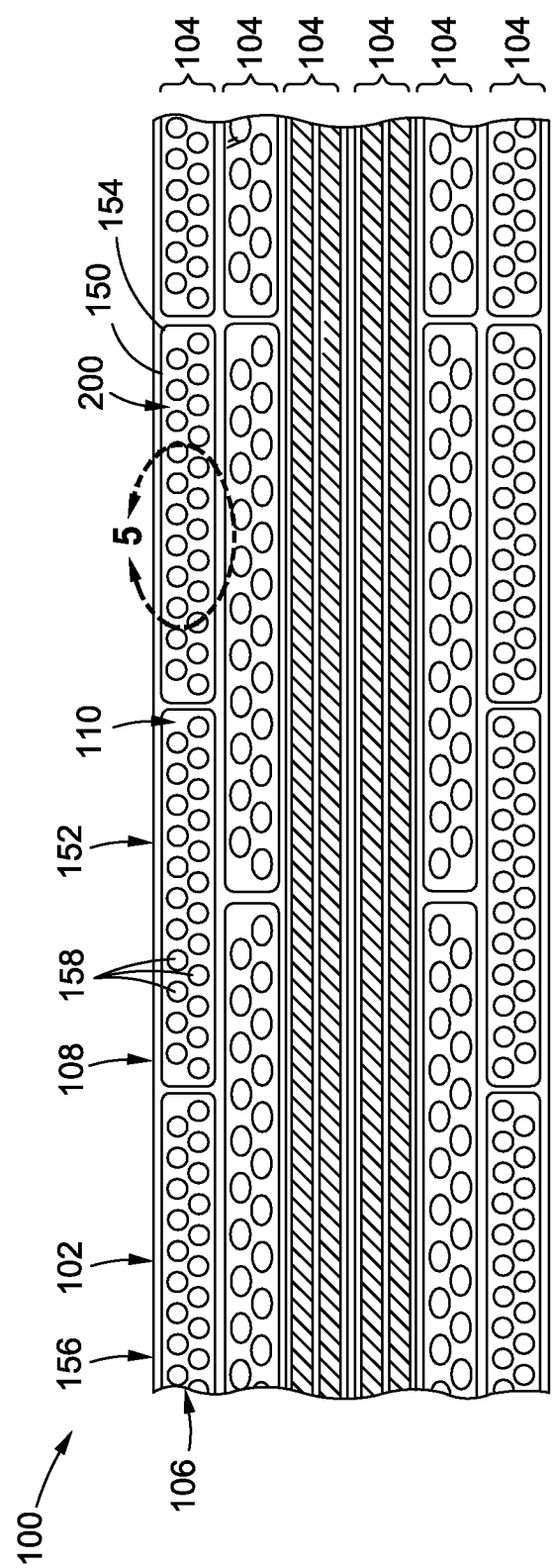
FIG. 3 shows a cross-section of a portion of the composite structure taken along line 3 of FIG. 2 and showing the reinforcing filaments of the unidirectional composite plies oriented at different angles.

FIG. 3 shows a cross-section of a portion of the composite structure 100 of FIG. 2 and showing the reinforcing filaments 158 of the unidirectional composite plies 104 oriented at different angles. Polymer nanoparticles 200 may be coupled to one or more of the reinforcing filaments 158 to maintain the minimum filament spacing 166 between adjacent reinforcing filaments 158. For example, each unidirectional tape 154 may include reinforcing filaments 158 to which polymer nanoparticles 200 may be coupled to maintain the filament spacing 166 between the other reinforcing filaments 158 of the unidirectional tape 154. Although not shown, polymer nanoparticles 200 may also be coupled to the outermost reinforcing filaments 158 of a fiber tow 150 or unidirectional tape 154 to maintain a minimum filament spacing 166 with the reinforcing filaments 158 of adjacent fiber tows 150 or unidirectional tapes 154. Polymer nanoparticles 200 may also be coupled to the reinforcing filaments 158 of woven fabric or braided fibers to maintain a desired filament spacing 166.

In FIG. 3, the reinforcing filaments 158 in the uppermost and lowermost composite plies 104 may be oriented along a direction perpendicular the plane the paper. The middle two composite plies 104 may include reinforcing filaments 158 oriented parallel to the plane of the paper. The composite plies 104 located between the middle and uppermost composite ply 104 and between the middle and lowermost composite plies 104 may contain reinforcing filaments 158 oriented non-parallel and non-perpendicular to the plane of the paper. However, adjacent composite plies 104 may include reinforcing filaments 158 oriented at any angle relative to one another.

A composite structure 100 may be formed by laying up a stack of composite plies 104 that may be pre-impregnated with resin 110 (e.g., prepreg composite plies). After layup of the composite plies 104 (FIG. 3), heat may be applied to reduce the viscosity of the resin 110 (FIG. 3) and allow the resin 110 to flow and intermingle with the resin 110 of adjacent composite plies 104. Heat and/or pressure may be applied to cure and/or solidify the resin 110 to form a composite structure 100. Polymer nanoparticles 200 may be coupled to one or more reinforcing filaments 158 prior to or during a pre-pregging operation. In some examples, polymer nanoparticles 200 may be applied to a reinforcing filament 158 during the manufacturing of the reinforcing filament 158. In one example described below (e.g., see FIG. 12), polymer nanoparticles 200 may be sprayed onto the reinforcing filaments 158 of a moving fiber tow 150.

Alternatively, a composite layup 102 may be formed by laying up a stack of dry fiber composite plies 104 containing reinforcing filaments 158 (FIG. 3) to which polymer nanoparticles 200 may be coupled. The dry fiber composite plies 104 may be consolidated and/or infused with resin 110 using any one of a variety of resin infusion processes. For example, resin 110 may be infused into dry fiber composite plies 104 using resin film infusion (RFI), resin transfer molding (RTM), vacuum assisted resin transfer molding (VARTM), controlled atmospheric pressure resin infusion (CAPRI), or any one of a variety of other resin transfer processes. Heat and/or pressure may be applied to cure and/or solidify the resin 110 to form a composite structure 100.

In any of the examples disclosed herein, the resin 110 and/or the polymer nanoparticles 200 may be formed from thermoplastic material and/or thermosetting material. Thermoplastic material may include acrylics, fluorocarbons, polyamides, polyolefins (e.g., polyethylenes, polypropylenes), polyesters, polycarbonates, polyurethanes, polyaryletherketones (e.g., polyetheretherketone (PEEK), polyetherketoneketone (PEKK), polyetherketoneetherketone (PEKEK)), etc.), and/or polyetherimides. Thermosetting material may include polyurethanes, phenolics, polyimides, sulphonated polymer (polyphenylene sulphide), a conductive polymer (e.g., polyaniline), benzoxazines, bismaleimides, cyanate esthers, polyesters, epoxies, and/or silsesquioxanes. The reinforcing filaments 158 may be formed from materials such as carbons, silicon carbide, boron, ceramic, and metallic material. The reinforcing filaments 158 may also be formed from glass such as E-glass (alumino-borosilicate glass), S-glass (alumino silicate glass), pure silica, borosilicate glass, optical glass, and other glass compositions.

Figure 4:
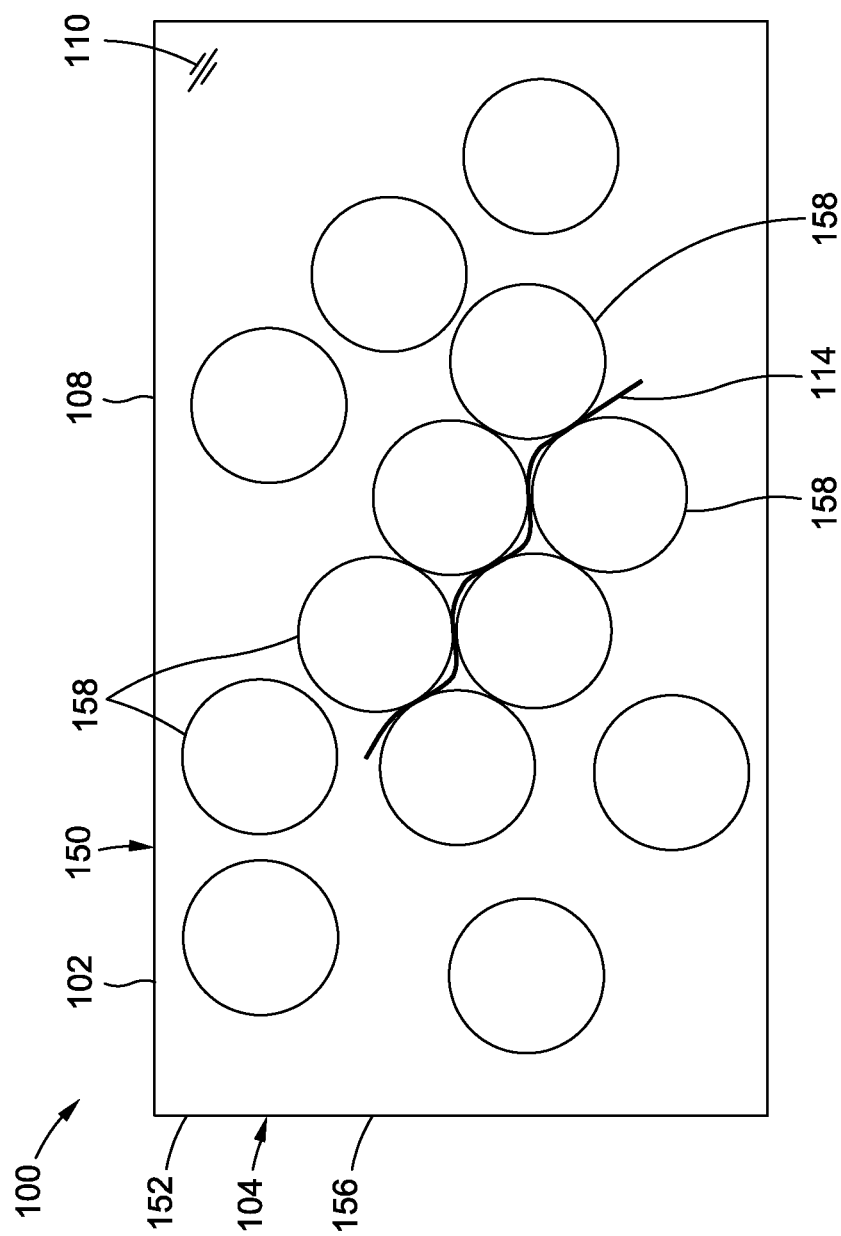
FIG. 4 is a schematic cross-sectional view of a plurality of reinforcing filaments embedded in resin and showing the reinforcing filaments in direct contact with one another and resulting in a crack in the resin.

FIG. 4 shows a cross-section of reinforcing filaments 158 embedded in a composition 108 of resin 110 and reinforcing filaments 158. The reinforcing filaments 158 may be included in the bundle of reinforcing filaments 158 that make up the fiber tows 150 of unidirectional tape, unidirectional sheet, woven fabric, braided fibers, and any one of a variety of other fiber forms. In FIG. 4, some of the reinforcing filaments 158 are in direct filament-to-filament contact with one another. The direct filament-to-filament contact between the reinforcing filaments 158 may represent regions of locally high fiber content in a composite structure 100. In addition, direct contact of reinforcing filaments 158 may inhibit resin flow between the reinforcing filaments 158 such as during resin infusion into a composite layup 102 which may result in incomplete wetting of the reinforcing filaments 158 creating undesirable voids and sites for crack nucleation. In addition, direct contact of the reinforcing filaments 158 may represent locations of high stress in a composite structure 100, and may result in a crack 114 forming in the resin 110 at the locations of direction filament-to-filament contact.

Figure 5:
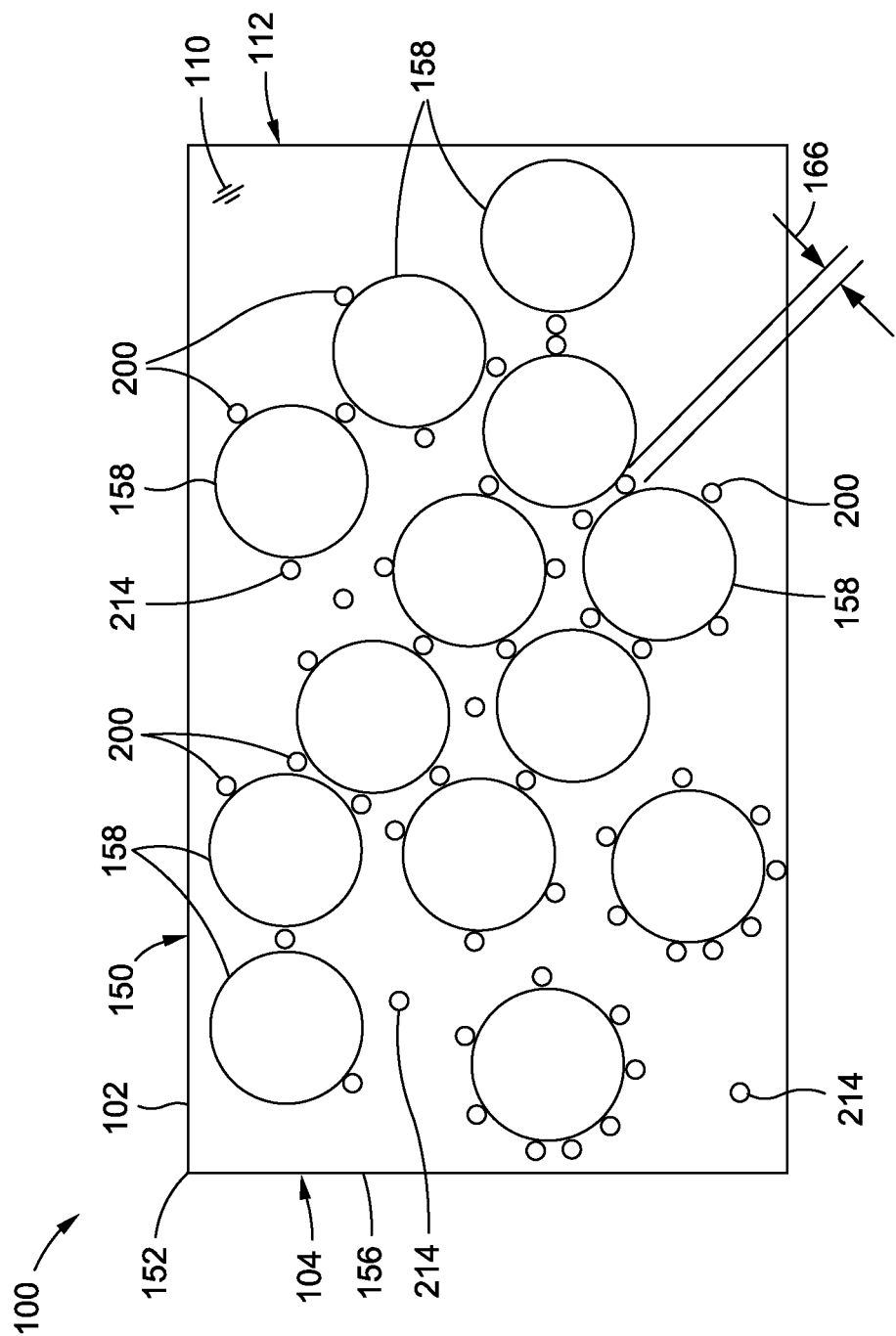
FIG. 5 is a schematic cross-sectional view of the reinforcing filaments of FIG. 4 and further including polymer nanoparticles maintaining a local filament spacing between the reinforcing filaments.

FIG. 5 is a cross-sectional view of the reinforcing filaments 158 of FIG. 4 and further including polymer nanoparticles 200 coupled to the reinforcing filaments 158. As can be seen, the polymer nanoparticles 200 have a small particle cross-sectional width 202 (FIG. 6) relative to the filament cross-sectional width 160. The polymer nanoparticles 200 maintain the local filament spacing 166 and advantageously prevent direct filament-to-filament contact and associated regions of locally high fiber content, and may thereby reduce or avoid stress concentrations at such locations. Also shown in FIG. 5 are non-coupled nanoparticles 214 that are non-coupled to reinforcing filaments 158 or to other polymer nanoparticles 200. Such loose or non-coupled nanoparticles 214 may be embedded within a fiber tow 150 and/or surrounded by the reinforcing filaments 158 of a fiber tow 150. Even though such loose nanoparticles 214 may be non-coupled to reinforcing filaments 158, the loose nanoparticles 200 may also act as spacers to maintain a filament spacing 166 between reinforcing filaments 158, and/or the loose nanoparticles may dissolve and toughen the resin 110.

Referring still to FIG. 5, shown are a plurality of polymer nanoparticles 200 which may be provided in a density or volume content sufficient to cause an increase in permeability of the fiber bed 152 of a composite layup 102 relative to the permeability of a fiber bed that is devoid of polymer nanoparticles 200. In addition, the polymer nanoparticles 200 may be included at a specific particle cross-sectional width 202 (e.g., diameter) and/or at a specific density or volume content in the resin 110 to achieve a desired fiber volume fraction in the composite structure 100. For example, a composite layup 102 may include a volume content of polymer nanoparticles 200 that result in a composite structure 100 having a fiber volume fraction of between 30 to 70 percent.

At a given point along the length of a reinforcing filament, polymer nanoparticles 200 (FIG. 5) may be positioned around the circumference of the reinforcing filament 158 (FIG. 5) such that the polymer nanoparticles 200 are circumferentially spaced apart from one another when the reinforcing filament 158 is viewed in cross-section. The circumferential spacing between a pair of polymer nanoparticles 200 on one reinforcing filament 158 may be such that direct filament-to-filament contact with another reinforcing filament 158 is not possible. A reinforcing filament 158 may also include a linear density of polymer nanoparticles 200 such that none of the polymer nanoparticles 200 may contact other polymer nanoparticles 200. In a non-limiting example, a reinforcing filament 158 may include a linear density of between approximately 1-1000 polymer nanoparticles 200 per unit length of the reinforcing filament 158 when the reinforcing filament 158 is viewed from the side.

As indicated above, the polymer nanoparticles 200 may be provided in a particle cross-sectional width 202 or diameter that is less than the filament cross-sectional width 160 or diameter. A reinforcing filament 158 may have a diameter of up to 10 microns. In some examples, a reinforcing filament 158 may have a diameter of approximately 5-7 microns. The polymer nanoparticles 200 have a particle cross-sectional width 202 of 10-200 nanometers. In some examples, the polymer nanoparticles 200 may have a cross-sectional width of between 10-100 nanometers. The particle cross-sectional width 202 may be selected to provide a filament spacing 166 that results in a fiber volume fraction of 30-70 percent in the final composite structure 100. In other examples, the quantity and cross-sectional width of the polymer nanoparticles 200 may be provided such that the fiber volume fraction of the final composite structure 100 is between approximately 40-65 percent.

The polymer nanoparticles 200 may be provided in a generally rounded or spherical shape which may reduce or minimize restrictions on the flow of resin 110 over the polymer nanoparticles 200 as the resin 110 infuses the reinforcing filaments 158. However, the polymer nanoparticles 200 are not limited to generally rounded or spherical shapes. For example, polymer nanoparticles 200 may be provided in other shapes not shown including, but not limited to, an oblong or elliptical shape, a three-dimensional shape such as a cylinder, a tube, a cube, a rectangle, a pyramid, and other non-rounded shapes. In one example, a high-aspect-ratio oval or cube shaped polymer nanoparticle (not shown) may be provided to promote mechanical entrapment between reinforcing filaments 158.

In some examples, the polymer nanoparticles 200 may be configured to be partially or fully dissolvable in the resin 110 at a predetermined point during the curing process. For example, the polymer nanoparticles 200 may be configured to remain in a solid state and thereby retain their initial shape (e.g., spherical) up to a certain point (e.g., at a certain temperature and/or associated time) during the resin infusion and/or resin cure cycle, after which the polymer nanoparticles 200 may start to partially or fully dissolve in the resin 110. In some examples, the dissolution of the polymer nanoparticles 200 may cause the polymer nanoparticles 200 to release from or separate from the reinforcing filaments 158.

In some embodiments, the polymer nanoparticles 200 may be formed of a material composition 108 (FIG. 4) that has a higher toughness than the toughness of the resin 110. Dissolution of the polymer nanoparticles 200 may result in a net increase in the toughness of the resin mixture 112 relative to the toughness of resin 110 that is devoid of polymer nanoparticles 200. In one example, the polymer nanoparticles 200 may be configured to retain their spherical shape at least up to the cure temperature of the resin 110 and/or up to completion of the majority of resin flow, at which point the polymer nanoparticles 200 may be configured to partially or fully dissolve in the resin 110.

FIG. 6 shows a first filament 162 and a second filament 164 embedded in resin 110. The first filament 162 is separated or spaced apart from the second filament 164 by a polymer nanoparticle 200. As can be seen, the particle cross-sectional width 202 is less than the filament cross-sectional width 160. In some examples, the polymer nanoparticle 200 may be coupled (e.g., bonded) to the first filament 162 and may contact the second filament 164 to maintain a filament spacing 166 between the first filament 162 and the second filament 164 and prevent the first filament 162 from directly contacting the second filament 164. In other examples, the polymer nanoparticle 200 may be coupled (e.g., bonded) to the first and second filament 162, 164, and may maintain a filament spacing 166 between the first and second filament 162, 164 and prevent direct contact between the first and second filament 162, 164.

Figure 8:
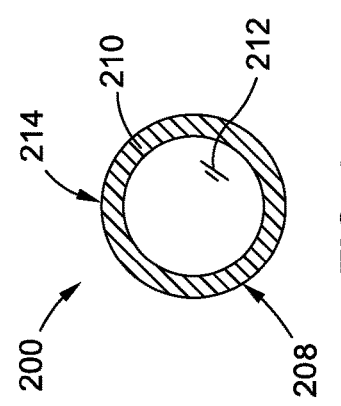
FIG. 8 is a schematic illustration of a core-sheath nanoparticle having a melt-fusible sheath.

FIG. 7 shows a first polymer nanoparticle 204 adjacent to (e.g., coupled or bonded to) a first filament 162 and a second polymer nanoparticle 206 adjacent to (e.g., coupled or bonded to) a second filament 164. The first polymer nanoparticle 204 may also be coupled (e.g., bonded) to the second polymer nanoparticle 206 which increases the filament spacing 166 between the first filament 162 and the second filament 164 and may prevent the first filament 162 from directly contacting the second filament 164. A composite layup 102 may include any number of combinations of the single nanoparticle spacing shown in FIG. 6 and the double nanoparticle spacing shown in FIG. 7. Furthermore, a composite layup 102 may include non-coupled or loose nanoparticles 214 as indicated above which may be embedded within a fiber tow 150 and surrounded by reinforcing filaments 158. Non-coupled nanoparticles 214 may also be located in other regions of a composite layup such as the interlaminar regions between adjacent fibers, or in other regions, to locally alter or improve the resin characteristics such as resin toughness FIG. 8 is a schematic illustration of a type of polymer nanoparticle 200 configured as a core-sheath nanoparticle 208, and which may be coupled to one or more reinforcing filaments 158 of a fiber tow 150 (FIG. 5). The core-sheath nanoparticle 208 may include a sheath 210 encapsulating a core 212. The sheath 210 may be configured to be coupled to at least one reinforcing filament 158. The sheath 210 and/or the core 212 may be formed of any one of the above-described thermosetting materials from which polymer nanoparticles 200 may be formed. In some examples, the sheath 210 and/or the core 212 may be formed of any one of the above-described thermoplastic materials from which polymer nanoparticles 200 may be formed. The sheath 210 may be formed of a different material than the core 212. In one example, the core 212 may have a glass transition temperature that may be higher than the glass transition temperature of the sheath 210.

Figure 9:
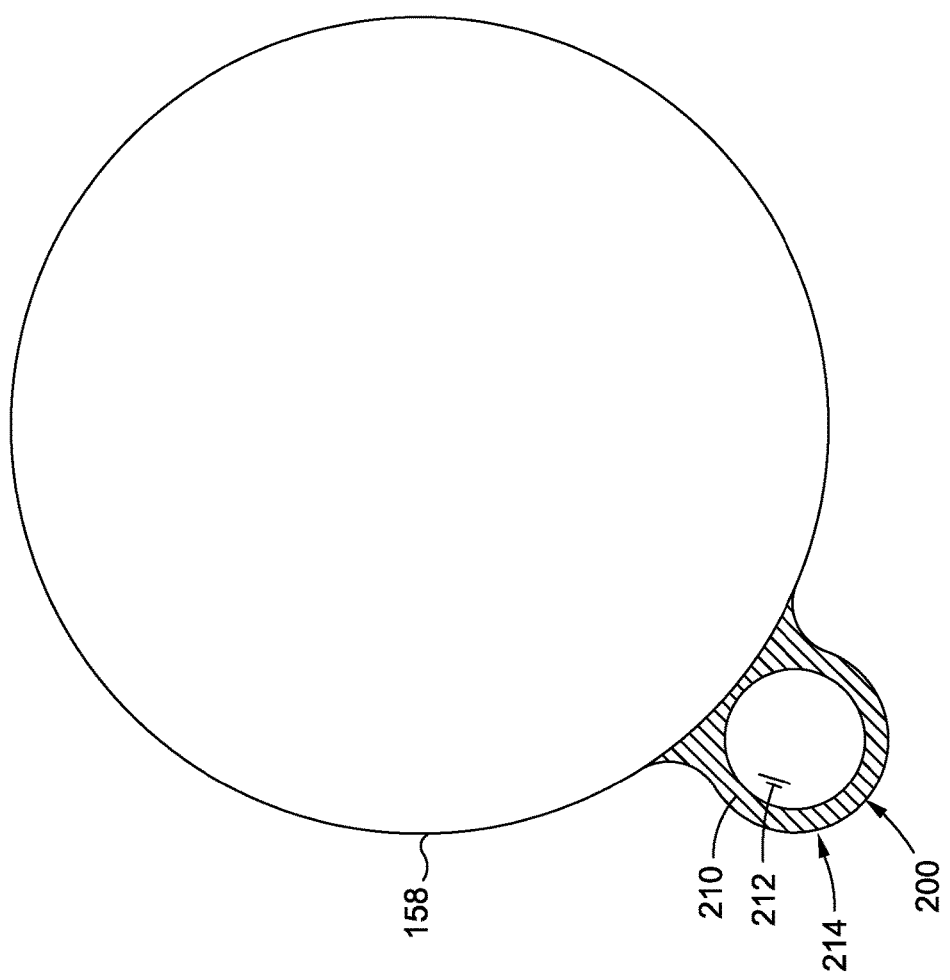
FIG. 9 is a schematic illustration of the sheath of a core-sheath nanoparticle melt-fused to a reinforcing filament.

FIG. 9 is a schematic illustration of the sheath 210 of a core-sheath nanoparticle 208. The sheath 210 may be formed of thermoplastic material. The temperature of the sheath 210 may be heated above its glass transition temperature which may allow the sheath 210 to adhesively bond or melt-fuse to a reinforcing filament 158, while the core 212 remains in a solid state. In some examples, the core 212 may be formed of insoluble material. In other examples, the core 212 may be formed of a material that is soluble of at a certain point during the process of curing the resin 110. For example, the core 212 may be soluble at the peak temperature and associated time period in the resin cure cycle.

In some examples, the sheath 210 may be configured to dissolve in the resin 110 at a certain point during the cure cycle. For example, the sheath 210 may dissolve in the resin 110 after a majority of the resin flow through the composite layup 102 has occurred. The sheath 210 may be formed of a thermoplastic material that may have a higher toughness than the toughness of the resin 110. The sheath 210 may also be soluble in the resin 110 prior to or during resin cure and which may result in an increase in the toughness of the resin 110. Dissolution of the sheath 210 may result in the core-sheath nanoparticle 208 releasing or separating from the reinforcing filament 158 after resin infusion of a composite layup 102. In this manner, partial or complete dissolution of the sheath 210 may allow for fiber bed 152 compaction to achieve a higher fiber volume fraction in the composite layup 102 following resin infusion. Alternatively, the sheath 210 may be insoluble in the resin 110 and may thereby maintain the reinforcing filaments at the filament spacing so that the composite layup maintains a desired fiber volume fraction after resin infusion and through resin cure.

FIG. 10 is a schematic illustration of a non-core-sheath polymer nanoparticle 200 coupled to a sizing 168 or surface coating that may optionally be applied to reinforcing filaments 158 such as during the manufacturing of the reinforcing filaments 158. Such sizing 168 may comprise a surface finish that may be deposited onto the surface of a reinforcing filament 158 to improve the adhesion between the reinforcing filaments 158 and the resin 110 and/or to protect the reinforcing filaments 158 from breakage such as during weaving or braiding of the reinforcing filaments 158 and/or during prepregging operations.

In any example disclosed herein, at least a portion of the polymer nanoparticles 200 may be formed of thermoplastic material that has a higher toughness than the resin 110. The polymer nanoparticles 200 may be configured to dissolve in the resin 110 prior to or during resin cure and may result in an increase in the toughness of cured resin 110. For example, a portion of the polymer nanoparticles 200 added to the base resin 110 may dissolve in the resin 110 after a certain point during the curing process as a means to increase the toughness of the resin 110. A remaining portion of the polymer nanoparticles 200 may be coupled to reinforcing filaments 158 to provide a desired level of permeability to the fiber bed 152. During the resin curing or solidification process, the polymer nanoparticles 200 coupled to the reinforcing filaments 158 may also dissolve after completion of a majority of resin flow.

In some examples, a resin mixture 112 may include more than one type of polymer nanoparticle 200. For example, a resin mixture 112 may include two or more different types of polymer nanoparticles 200 such as one type of polymer nanoparticle 200 that is soluble in the resin 110, and another type of polymer nanoparticle 200 that is insoluble in the resin 110. Even further, a resin mixture 112 may include polymer nanoparticles 200 that have different solubilities. For example, a resin mixture 112 may include polymer nanoparticles 200 that have different levels of solubility that caused dissolution at different times such as during the curing of the resin 110.

An increase in the resin toughness may reduce or prevent the propensity for crack growth or crack initiation in the resin 110. By reducing the propensity for crack growth or crack initiation in one or more locations of a composite structure 100, the load-carrying capability of the composite structure 100 may be increased which may allow for a reduction in the structural mass of the composite structure 100. A reduction in the structural mass may provide several performance advantages. In the case of an aircraft, a reduction in structural mass may correspond to an increase in fuel efficiency, range, payload capacity, or other performance improvements.

Figure 11:
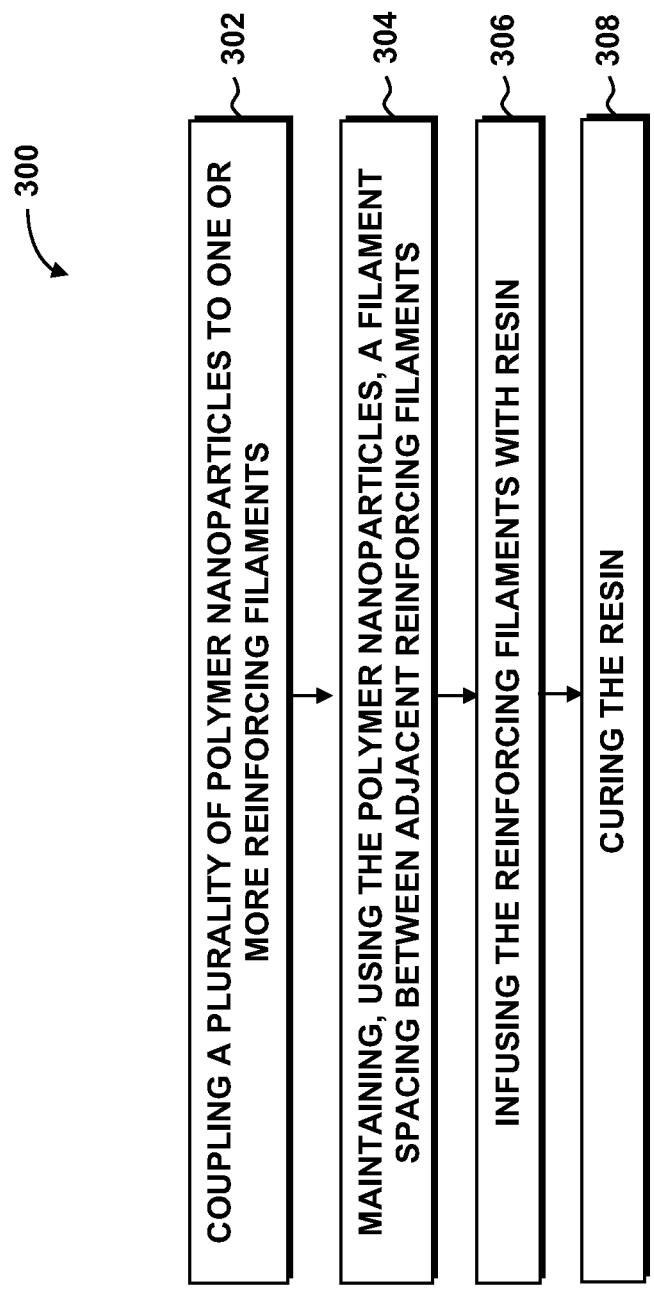
FIG. 11 is a flowchart illustrating one or more operations that may be included in a method of manufacturing a composite structure.

FIG. 11 is a flowchart illustrating one or more operations that may be included in a method 300 of manufacturing a composite structure 100. Step 302 of the method may include coupling a plurality of polymer nanoparticles 200 to one or more reinforcing filaments 158. As indicated above, a plurality of reinforcing filaments 158 may be bundled together to form a fiber tow 150. The polymer nanoparticles 200 may be coupled to or applied to the reinforcing filaments 158 during the manufacturing of the reinforcing filaments 158. In some examples, polymer nanoparticles 200 may be applied to reinforcing filaments 158 as the reinforcing filaments 158 are drawn from a fiber forming apparatus (not shown).

In some examples, polymer nanoparticles 200 may be applied to reinforcing filaments 158 as the fiber tows 150 are formed into unidirectional tape, unidirectional sheet, woven fabric, braided fibers, and other fiber forms. Polymer nanoparticles 200 may also be coupled to or applied to one or more reinforcing filaments 158 during prepregging operations wherein resin 110 is applied to fiber tows, unidirectional tape, woven fabric, braided fibers, and other fiber forms. Additionally, polymer nanoparticles 200 may be added systematically in a printed pattern (not shown) onto the reinforcing filaments 158 such that the content of the polymer nanoparticles 200 varies across a surface of the reinforcing filaments 158. The printed pattern may have the effect of altering one or more properties of a composite structure containing the reinforcing filaments 158.

Figure 12:
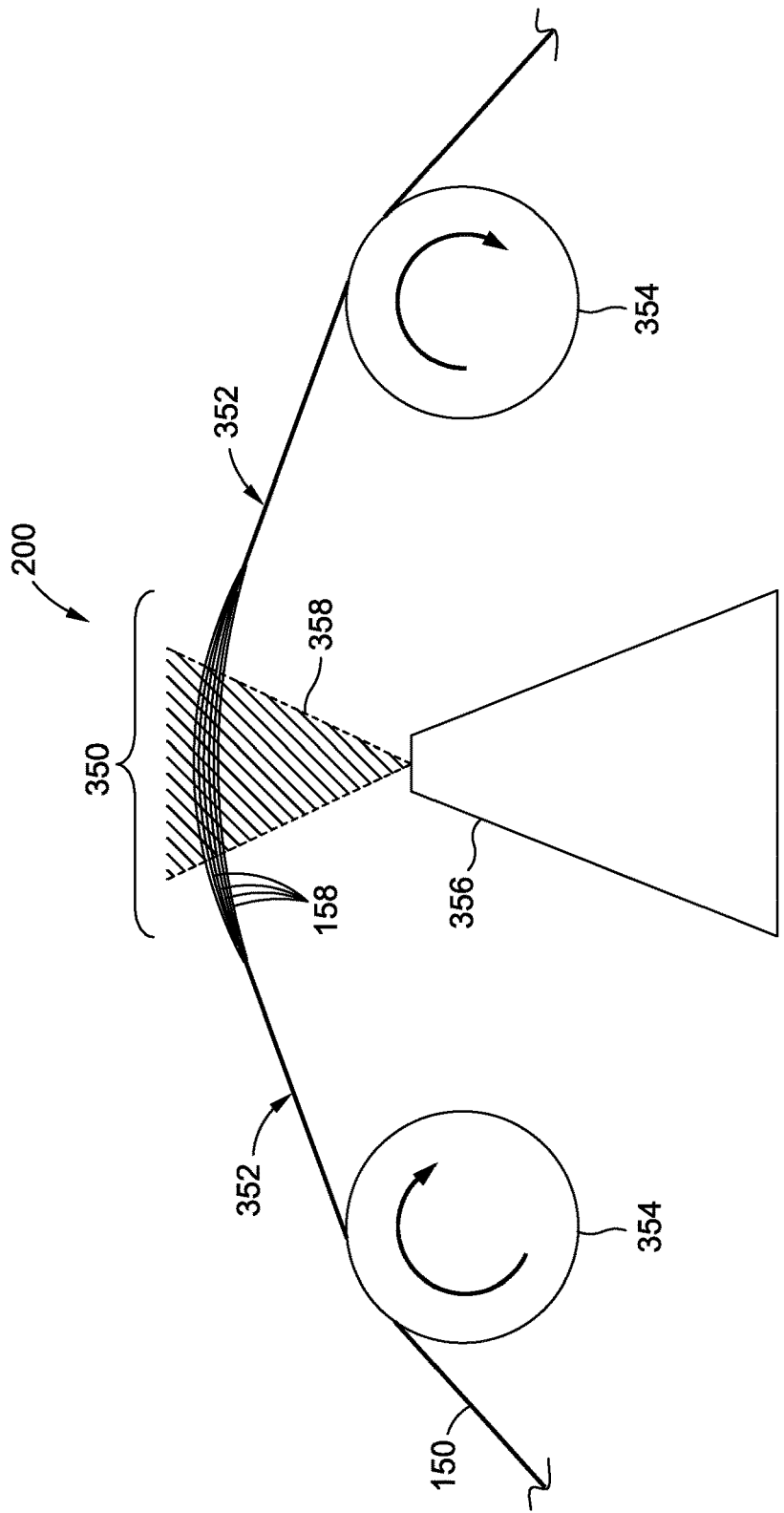
FIG. 12 is a schematic illustration of a system for continuously applying polymer nanoparticles to the reinforcing filaments of a fiber tow.

Referring briefly to FIG. 12, shown is a schematic illustration of one example of a system for continuously applying polymer nanoparticles 200 to individual reinforcing filaments 158 of a moving fiber tow 150. The system may include a spray nozzle 356 and a pair of rollers 354 for supporting and passing a fiber tow 150 through a plume 358 of gas containing polymer nanoparticles 200 emitted by a spray nozzle 356. The spray nozzle 356 may be a high-pressure spray nozzle that may temporarily separate or spread apart the reinforcing filaments 158 into a separated state 350 as the fiber tow 150 passes through the plume 358 of high-pressure gas containing polymer nanoparticles 200.

In some examples, the fiber tow 150 may be heated prior to the fiber tow 150 passing through the plume of gas. For example, each one of the rollers 354 may be connected to a source of electrical power for resistance heating of the fiber tow 150. Alternatively, the fiber tow 150 may be heated by other means including, but not limited to, blowing hot air onto the fiber tow, radiation heating of the fiber tow, or other heating means. In some examples, the polymer nanoparticles 200 in the plume 358 may be charged such that they are attracted to the oppositely charged surface of the separated reinforcing filaments 158. Contact of the polymer nanoparticles 200 with the heated surface of the reinforcing filaments 158 may result in the polymer nanoparticles 200 bonding or melt-fusing to the reinforcing filaments 158. After the reinforcing filaments 158 exit the plume 358, the reinforcing filaments 158 may return to a non-separated state 352 of the fiber tow 150. The fiber tow 150 containing polymer nanoparticles 200 may be arranged into any one of a variety of different prepreg or dry fiber forms (e.g., a unidirectional tape, woven fabric, braided fibers) for layup and processing into a composite structure 100.

In Step 302, the coupling of the polymer nanoparticles 200 to reinforcing filaments 158 may include coupling at least a portion of the polymer nanoparticles 200 to reinforcing filaments 158 (e.g., FIG. 6) and/or to other polymer nanoparticles 200 (e.g., FIG. 7). A portion of the polymer nanoparticles 200 may be provided as loose or non-coupled nanoparticles 214 that may be non-coupled or non-bonded to a reinforcing filament 158 or to other polymer nanoparticles 200. For example, FIG. 5 illustrates several non-coupled nanoparticles 214 in the resin 110. As indicated above, such non-coupled nanoparticles 214 may be embedded within a fiber tow 150 and may serve the same spacing function as the polymer nanoparticles 200 that are coupled to reinforcing filaments 158. In any one of the examples disclosed herein, the non-coupled nanoparticles 214 and/or the polymer nanoparticles 200 may be soluble within the resin 110 to alter the resin 110 properties such as improving the resin processing characteristics and/or improving the toughness of the resin 110, as mentioned above.

In some examples, the step of coupling the polymer nanoparticles 200 to the reinforcing filaments 158 may include melt-fusing the sheath 210 of a core-sheath nanoparticle 208 to one or more reinforcing filaments 158. The core 212 may have a glass transition temperature that may be higher than the glass transition temperature of the sheath 210 which may be formed of thermoplastic material. The method may include heating the sheath 210 to a temperature above its glass transition temperature and below the glass transition temperature of the core 212. The method may further include heating one or more of the reinforcing filaments 158, placing the sheaths 210 of the core-sheath nanoparticles 208 into contact with the reinforcing filaments 158, and causing the sheaths 210 to bond or melt-fuse to the reinforcing filament 158 while the core 212 remains in a generally solid state. In one example, the method may include spraying the polymer nanoparticles 200 onto heated reinforcing filaments 158 using a plume 358 of gas spray containing polymer nanoparticles 200, as mentioned above.

In a still further example, the step of coupling polymer nanoparticles 200 to reinforcing filaments 158 may include charging the reinforcing filaments 158 with an electric charge of a first polarity, and charging the polymer nanoparticles 200 with an electric charge of a second polarity opposite the first polarity. The method may further include placing the polymer nanoparticles 200 into proximity to the reinforcing filaments 158 and allowing the resulting attraction between the first and second polarity to pull the polymer nanoparticles 200 into contacting relation with the reinforcing filaments 158. As may be appreciated, other methods may be implemented for applying polymer nanoparticles 200 to reinforcing filaments 158. For example, polymer nanoparticles 200 may be provided in a solvent suspension which may be applied as a coating to the reinforcing filaments 158. As indicated above, the coupling of polymer nanoparticles 200 to reinforcing filaments 158 may occur prior to or during a pre-pregging operation and/or prior to resin infusion of a dry fiber preform using any one of a variety of different resin infusion technologies.

Step 304 of the method 300 may include maintaining, using the polymer nanoparticles 200, a filament spacing 166 between adjacent reinforcing filaments 158. As indicated above, the presence of the polymer nanoparticles 200 may keep the reinforcing filaments 158 from contacting one another and thereby providing permeability to the fiber bed 152. The filament spacing 166 may allow for a clear path for resin 110 to flow between the reinforcing filaments 158 such that the resin 110 may infuse or wet out the reinforcing filaments 158 within the fiber bed 152. In addition, the polymer nanoparticles 200 may prevent direct contact between reinforcing filaments 158. By reducing or preventing direct filament-to-filament contact between reinforcing filaments 158, the presence of the polymer nanoparticles 200 may avoid regions of locally high fiber content in a composite structure 100 which may otherwise lead to stress concentrations and the potential for crack initiation at such locations.

Step 306 of the method 300 may include infusing the reinforcing filaments 158 with resin 110. As indicated above, the method may include arranging the reinforcing filaments 158 into a composite layup 102. For example, dry fiber composite plies 104 may be arranged in a stacked formation. The method may include infusing the reinforcing filaments 158 with resin 110 by any one of the above-mentioned wet resin layup processes or by resin film infusion. The method may additionally include maintaining a filament spacing 166 between the reinforcing filaments 158 during resin infusion.

The method may further include dissolving at least a portion of the polymer nanoparticles 200 in the resin 110 following resin infusion of the reinforcing filaments 158. For example, some of the polymer nanoparticles 200 coupled to reinforcing filaments 158 may be formed of a material that is soluble in the resin 110 after a predetermined temperature and/or associated time during the layup and curing process. The method may include compacting the reinforcing filaments 158 together after dissolving at least a portion of the polymer nanoparticles 200 as a means to increase the fiber volume fraction of the composite structure 100.

Step 308 of the method 300 may include curing or solidifying the resin 110 to form a composite structure 100. Following resin infusion of a fiber bed 152 containing reinforcing filaments 158, at least a portion of polymer nanoparticles 200 may separate or release from the reinforcing filaments 158 as a result of the dissolution of the polymer nanoparticles 200. The dissolution of the polymer nanoparticles 200 may allow for additional fiber bed compaction such that the final composite structure 100 may achieve a higher fiber volume fraction after resin infusion and during resin cure. In some examples, the soluble polymer nanoparticles 200 may have a higher toughness relative to the toughness of the base resin 110, resulting in an increase in the toughness of the resin 110 of the cured composite structure 100. For example, a portion of the polymer nanoparticles 200 may be formed of thermoplastic material that may dissolve in the resin 110 prior to or during resin cure and causing an increase in the toughness of cured resin 110.

In other examples, the method may include maintaining at least a portion of the polymer nanoparticles 200 in a solid state after resin infusion and through resin cure, and thereby maintaining a desired fiber volume fraction of the composite layup 102 after resin infusion. The desired fiber volume fraction may be maintained in the final composite article by selection of the particle cross-sectional width 202 and by selection of the total volume of polymer nanoparticles 200 relative to the total volume of the composite layup 102.

Illustrative embodiments of the disclosure may be described in the context of a method (not shown) of manufacturing and/or servicing an aircraft, spacecraft, satellite, or other aerospace component. Pre-production, component manufacturing, and/or servicing may include specification and design of aerospace components and material procurement. During production, component and subassembly manufacturing, and system integration of aerospace components takes place. Thereafter, the aircraft, spacecraft, satellite, or other aerospace component may go through certification and delivery in order to be placed in service.

In one example, aerospace components produced by the manufacturing and servicing method may include an airframe with a plurality of systems and an interior. Examples of the plurality of systems may include one or more of a propulsion system, an electrical system, a hydraulic system, and an environmental system. Any number of other systems may be included. Although an aerospace example is shown, different illustrative embodiments may be applied to other industries, such as the automotive industry.

Apparatuses and methods embodied herein may be employed during at least one of the stages of an aerospace component manufacturing and/or servicing method. In particular, a composite structure 100 (e.g., see FIG. 1), a coating, an injection-molded plastic, and/or an adhesive may be manufactured during any one of the stages of the aerospace component manufacturing and servicing method. For example, without limitation, a composite structure may be manufactured during at least one of component and subassembly manufacturing, system integration, routine maintenance and service, or some other stage of aircraft manufacturing and servicing. Still further, a composite structure may be used in one or more structures of aerospace components. For example, a composite structure may be included in a structure of an airframe, an interior, or some other part of an aircraft, spacecraft, satellite, or other aerospace component.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A fiber tow for embedding in a resin, comprising:
a plurality of reinforcing filaments each having a filament cross-sectional width;
a plurality of polymer nanoparticles;
the polymer nanoparticles having a particle cross-sectional width that is less than the filament cross-sectional width;
at least some of the polymer nanoparticles are directly and independently coupled to at least one of the reinforcing filaments and/or to other polymer nanoparticles prior to one of pre-pregging or resin infusion of the fiber tow;
the polymer nanoparticles being located in spaced relation to each other on the at least one of the reinforcing elements;
the polymer nanoparticles having a material composition configured to remain in a solid state below a cure temperature of the resin, and dissolve in the resin as a result of the temperature of the polymer nanoparticles reaching the cure temperature of the resin; and
the reinforcing filaments being spaced apart at the local filament spacing via the polymer nanoparticles prior to and during one of pre-pregging or resin infusion.

2. The fiber tow of claim 1, wherein:
the plurality of reinforcing filaments include a first filament and a second filament;
the plurality of polymer nanoparticles include a first polymer nanoparticle coupled to the first filament and a second polymer nanoparticle coupled to the second filament; and
the first polymer nanoparticle contacting the second filament and/or the second polymer nanoparticle.

3. The fiber tow of claim 1, wherein:
the polymer nanoparticles have a particle cross-sectional width of 10-200 nanometers.

4. The fiber tow of claim 1, wherein:
the polymer nanoparticles are generally spherical.

5. The fiber tow of claim 1, wherein:
the polymer nanoparticles are formed of thermoplastic material comprising at least one of the following: acrylics, fluorocarbons, polyamides, polyolefins, polyethylenes, polyesters, polycarbonates, polypropylenes, polyurethanes, polyaryletherketones, polyetherimides, polyethersulfone, polysulfone, and polyphenylsulfone;
the resin is formed of thermosetting material comprising at least one of the following: polyurethanes, phenolics, polyimides, sulphonated polymer (polyphenylene sulphide), a conductive polymer (e.g., polyaniline), benzoxazines, bismaleimides, cyanate esthers, polyesters, epoxies, thiols, and silsesquioxanes.

6. The fiber tow of claim 1, wherein:
at least a portion of the polymer nanoparticles are core-sheath nanoparticles additionally comprising a sheath encapsulating a core, the sheath being formed of a different material than the core; and
the sheath being coupled to at least one reinforcing filament.

7. The fiber tow of claim 6, wherein:
the sheath is formed of thermoplastic material that is configured to melt-fuse to the reinforcing filament as a result of a temperature of the sheath reaching a glass transition temperature of the sheath.

8. A composition, comprising:
a resin; and
a plurality of fiber tows embedded in the resin, one or more of the fiber tows including a plurality of reinforcing filaments, each reinforcing filament having a filament cross-sectional width;
a plurality of polymer nanoparticles coupled to the reinforcing filaments, at least some of the polymer nanoparticles being directly and independently coupled to at least some of the reinforcing filaments and/or to other polymer nanoparticles prior to one of pre-pregging or resin infusion of the fiber tows, the polymer nanoparticles being located in spaced relation to each other on at least one of the reinforcing elements;
the polymer nanoparticles having a particle cross-sectional width that is less than the filament cross-sectional width; and
the polymer nanoparticles having a material composition configured to remain in a solid state below a cure temperature of the resin, and being configured to dissolve in the resin as a result of the temperature of the polymer nanoparticles reaching the cure temperature of the resin; and
the reinforcing filaments being spaced apart at the local filament spacing via the polymer nanoparticles prior to and during one of pre-pregging or resin infusion.

9. The composition of claim 8, wherein:
the polymer nanoparticles have a particle cross-sectional width of 10-200 nanometers.

10. The composition of claim 8, wherein:
at least a portion of the polymer nanoparticles are non-coupled to a reinforcing filament or a polymer nanoparticle.

11. The composition of claim 8, wherein:
at least a portion of the polymer nanoparticles are core-sheath nanoparticles additionally comprising a sheath encapsulating a core; and
the sheath being configured to melt-fuse to at least one reinforcing filament as a result of a temperature of the sheath reaching a glass transition temperature of the sheath.

12. The composition of claim 8, wherein:
at least a portion of the polymer nanoparticles are formed of a thermoplastic material having a higher toughness than the resin.

13. The composition of claim 8, wherein:
the polymer nanoparticles are formed of thermoplastic material comprising at least one of the following: acrylics, fluorocarbons, polyamides, polyolefins, polyesters, polycarbonates, polyurethanes, polyaryletherketones, polyetherimides, polyethersulfone, polysulfone, and polyphenylsulfone;
the resin is formed of thermosetting material comprising at least one of the following: polyurethanes, phenolics, polyimides, sulphonated polymer, a conductive polymer, benzoxazines, bismaleimides, cyanate esthers, polyesters, epoxies, and silsesquioxanes.

14. A method of manufacturing a composite structure, comprising:
directly and independently coupling a plurality of polymer nanoparticles to one or more reinforcing filaments of a fiber tow prior to one of pre-pregging or resin infusion of the fiber tow, the polymer nanoparticles being located in spaced relation to each other on one or more of the reinforcing elements, each reinforcing filament having a filament cross-sectional width;
the polymer nanoparticles having a particle cross-sectional width that is less than the filament cross-sectional width;
maintaining, using the polymer nanoparticles, a filament spacing between adjacent reinforcing filaments via the polymer nanoparticles prior to and during one of pre-pregging or resin infusion of the fiber tow; and
the polymer nanoparticles having a material composition configured to remain in a solid state below a cure temperature of a resin, and dissolve in the resin as a result of the temperature of the polymer nanoparticles reaching the cure temperature of the resin.

15. The method of claim 14, wherein:
at least a portion of the polymer nanoparticles are coupled to at least one of the reinforcing filaments and/or to other polymer nanoparticles.

16. The method of claim 14, wherein at least a portion of the polymer nanoparticles are core-sheath nanoparticles additionally comprising a sheath encapsulating a core, the step of coupling the polymer nanoparticles to one or more reinforcing filaments includes:
at least partially melt-fusing the sheath of the polymer nanoparticles to one or more reinforcing filaments as a result of a temperature of the sheath reaching a glass transition temperature of the sheath.

17. The method of claim 16, wherein the step of melt-fusing the sheath of the polymer nanoparticles to the reinforcing filament includes:
heating the reinforcing filaments; and
spraying the polymer nanoparticles onto a heated reinforcing filament using a plume of gas containing polymer nanoparticles.

18. The method of claim 14, further including:
arranging the reinforcing filaments in a composite layup;
infusing the reinforcing filaments with the resin; and
maintaining, using the polymer nanoparticles, a filament spacing between the reinforcing filaments during resin infusion.

19. The method of claim 18, further including:
dissolving at least a portion of the polymer nanoparticles in the resin following resin infusion of the reinforcing filaments; and
compacting the reinforcing filaments together after dissolving the portion of the polymer nanoparticles to increase a fiber volume fraction of the composite structure.

20. The method of claim 18, further including:
maintaining a portion of the polymer nanoparticles in a solid state after resin infusion; and
maintaining a desired fiber volume fraction of the composite layup after resin infusion and through resin cure.

21. The method of claim 18, wherein at least a portion of the polymer nanoparticles are formed of a thermoplastic material having a higher toughness than the resin, the method further including:
increasing, as a result of dissolution of the polymer nanoparticles, the toughness of the resin relative to resin lacking polymer nanoparticles.

* * * * *